United States Patent [19]

Flaugher et al.

[11] Patent Number: 4,895,244

[45] Date of Patent: Jan. 23, 1990

[54] APPARATUS FOR ALIGNING GLASS SHEETS IN A PRODUCTION LINE

[75] Inventors: Jeffery R. Flaugher, Carlton, Mich.; Allan T. Enk, Toledo; Frank J. Hymore, Oregon, Ohio

[73] Assignee: Libbey-Owens-Ford Co., Toledo, Ohio

[21] Appl. No.: 231,652

[22] Filed: Aug. 10, 1988

Related U.S. Application Data

[63] Continuation of Ser. No. 890,105, Jul. 28, 1986, abandoned.

[51] Int. Cl.⁴ .............................................. B65G 47/24
[52] U.S. Cl. .................... 198/394; 198/395; 198/401; 198/456; 198/502.2
[58] Field of Search .............. 198/456, 434, 394, 395, 198/401, 502.2; 65/106, 158, 160, 163, 273

[56] References Cited

U.S. PATENT DOCUMENTS

| | | | |
|---|---|---|---|
| 2,828,917 | 4/1958 | Wheeler et al. | 198/502.2 X |
| 3,638,564 | 2/1972 | Prange et al. | 198/434 X |
| 3,701,643 | 10/1972 | Frank | 65/160 X |
| 3,977,858 | 8/1976 | Taguchi | 65/160 X |
| 3,992,182 | 11/1976 | Frank | 198/461 X |
| 4,015,968 | 4/1977 | Revells et al. | 65/273 X |
| 4,205,744 | 6/1980 | Timmons et al. | 198/456 X |
| 4,228,886 | 10/1980 | Moran | 198/395 |
| 4,440,288 | 4/1984 | Thomas et al. | 198/460 X |
| 4,488,846 | 12/1984 | Halberschmidt et al. | 198/460 X |
| 4,493,412 | 1/1985 | Krehnovi | 198/434 |
| 4,511,242 | 4/1985 | Ashbee | 198/394 X |
| 4,632,688 | 12/1986 | Rahrig | 65/160 X |

Primary Examiner—Robert J. Spar
Assistant Examiner—D. Glenn Dayoan
Attorney, Agent, or Firm—Marshall & Melhorn

[57] ABSTRACT

An apparatus for aligning glass sheets moving on a conveyor line prior to shaping on a bending apparatus includes a pair of stops for engaging the leading edge of the glass sheets and a pair of side pushers for engaging the end edges of the glass sheets to align the glass sheets with respect to a reference line. The spacing between the side pushers is automatically selected in accordance with the predetermined sequence of glass sheets. In addition, a sensor detects a mark on the sheets to generate a sequence signal identifying the sheets. The sequence signal is utilized to signal that a sheet is missing or an improper sequence, and/or the signal is utilized to control the means for automatically adjusting the spacing of the side pushers. The stop pins can be adjusted individually in a direction parallel to the reference line and a direction transverse to the reference line. Sensors are provided to detect the alignment of the leading edge of a glass sheet with respect to the reference line and generate an alignment signal. The alignment signal is utilized to position the stop pins along their parallel paths if the glass sheets are not in the proper alignment.

17 Claims, 5 Drawing Sheets

APPARATUS FOR ALIGNING GLASS SHEETS IN A PRODUCTION LINE

This application is a continuation of Ser. No. 890,105 filed July 28, 1986, now abandoned.

BACKGROUND OF THE INVENTION

The present invention relates generally to an apparatus for aligning glass sheets in a production line and, particularly, to an apparatus for aligning sheets in a windshield bending operation.

The movement of glass sheets along a production line presents the problem of properly aligning the sheets at one or more work stations. One prior art aligning apparatus is disclosed in U.S. Pat. No. 3,638,564 in which a glass sheet is moved on a conveyor belt to an orientating station where a pair of edge engaging members and a pair of end engaging members orient the glass sheet longitudinally and laterally on the conveyor belt. Suction then is applied to hold the glass sheet in place while the conveyor belt moves the glass sheet to a work station where a predetermined pattern is applied by a silk-screen process. Each of the edge engaging members is hydraulically actuated and its relative position is manually adjustable by rotation of a threaded rod in a threaded sleeve to which a hydraulic cylinder is pivotly secured.

U.S. Pat. No. 3,701,643 and U.S. Pat. No. 3,992,182 both disclose aligning devices for positioning a moving glass sheet on a conveyor in a glass sheet production line. A pair of glass edge engagement members are located on opposite sides of the conveyor and move with the conveyor at the speed of the glass sheet. The engagement members are mounted on reciprocating carriages which move into and out of engagement with opposed edges of the glass sheets to align them.

U.S. Pat. No. 4,205,744 discloses a device for locating a windshield as it is being moved between two conveyor lines. A locating bar is manually adjustable on a threaded shaft to permit location of various lengths of windshields. A pair of locating pads are provided at the ends of the locating bar. A windshield is moved by a first conveyor into a holding structure which will rotate the windshield through 180° and move it laterally to place it on the end of a second offset conveyor. During the lateral movement, one edge of the windshield comes into contact with one of the locating pads to position the windshield when it is placed on the second conveyor.

U.S. Pat. No. 4,367,107 discloses an apparatus for aligning a pair of bent glass sheets in an assembly station. The stacked glass sheets are moved into the assembly station and guide rollers engage the top and bottom edges and the end edges of the glass sheets. Both sheets are engaged by suction means and separated vertically while a flexible sheet layer is inserted between them. The glass sheets are reassembled to form a sandwich to be laminated.

U.S. Pat. No. 4,440,288 and U.S. Pat. No. 4,488,846 both disclose sensors for controlling the spacing of objects being moved between two conveyors. In the '288 patent, pans of dough are collected at a gate positioned at the end of a grouping conveyor being fed from an unloader conveyor. A pan sensor is moved along the grouping conveyor to determine when a moving pan is a predetermined distance from one or more stopped pans so that the speed of the conveyor can be reduced below a speed at which rising dough would fall when the moving pan strikes the stopped pan. The '846 patent discloses a device for controlling the movement of an auxiliary conveyor which is feeding glass sheets onto a main conveyor. The auxiliary conveyor is stopped until the distance between the last sheet on the main conveyor and the next sheet on the auxiliary conveyor is equal to a predetermined distance at which point the auxiliary conveyor is started to move the stopped glass sheet onto the main conveyor.

U.S. Pat. No. 4,493,412 discloses a device for positioning glass sheets on a conveyor platform prior to removal by a robot. A leading edge of the glass sheet engages fixed stop pins. Then a pair of transversely moveable tables advance to engage the opposed side edges of the article. Finally, adjustable pins are moved vertically and longitudinally into engagement with the trailing edge of the article to align the article in a precise position relative to a fixed reference point.

U.S. Pat. No. 4,458,628 discloses a turn table for supporting a glass panel and moving it relative to a robot glass panel is supplied to the turn table by a conveyor. The panel is located on the turn table by a plurality of positioning shoes hydraulically actuated in a vertical direction to engage the peripheral edges of the glass panel. The panel is then gripped with vacuum cups and the shoes are retracted before the turn table begins rotation.

In a laminated anti-laceration windshield production line, an outer curved sheet, an inner curved sheet and a curved cover plate are stacked with intervening plastic layers. These glass sheets must be properly oriented prior to the lamination process in order to provide proper edge alignment for accepting a vacuum ring. Since the glass sheets are curved, they are formed of decreasing length from the outer sheet to the inner cover plate such that the edges can be aligned. All of the prior art systems discussed above would have a problem properly aligning the three differently sized sheets.

SUMMARY OF THE INVENTION

The present invention is an apparatus for aligning different size glass sheets as they are conveyed in a predetermined order to the entrance of a furnace. The sheets are oriented transverse to the direction of travel. The furnace heats the glass sheets to softening temperatures suitable for bending. A pair of vertically extending stops engage the leading edge of the glass sheet in front of the opening to the furnace. A pair of side pushers are actuated in a horizontal direction to move into engagement with the opposed ends of the glass sheet to align it into a predetermined position. The pushers and the front stops are then removed and the conveyor moves the sheet through the furnace. The distance between the side pushers is automatically adjusted by a stepper motor drive to accommodate the different lengths of glass sheets.

The apparatus also includes a control system and sensors for responding to the absence or misalignment of the glass sheets. Sensors mounted at the sides of the conveyor adjacent the entrance to the furnace will detect the absence of a sheet and sound an alarm indicating that the orderly sequence of glass sheets has been interrupted. Sensors in the bending area will detect whether the assemblies entering the bending apparatus are skewed. If the assemblies are skewed, the front stops will be automatically adjusted to realign the glass sheets as they enter the furnace. A sensor at the entrance to the furnace can also be utilized to detect indicia on the glass sheets to determine that they are in the proper order and/or to determine if a sheet is missing. Sensors can also be located at the front of the furnace to detect a skewing problem and control the location of the front stops to correct the problem before the glass sheets reach the bending area.

Accordingly, it is an object of the present invention to provide an aligning apparatus which facilitates the use of a conventional vacuum ring on curved windshield assemblies stacked for lamination.

It is another object of the present invention to provide an apparatus for aligning glass sheets which automatically adjusts to different size sheets as they are moved down an assembly line.

BRIEF DESCRIPTION OF THE DRAWINGS

The above as well as other objects of the invention will become apparent to one skilled in the art from reading the following detailed description of a preferred embodiment of the invention when considered in the light of the attached drawings in which.

DESCRIPTION IN THE PREFERRED EMBODIMENT

Figures 1, 2:
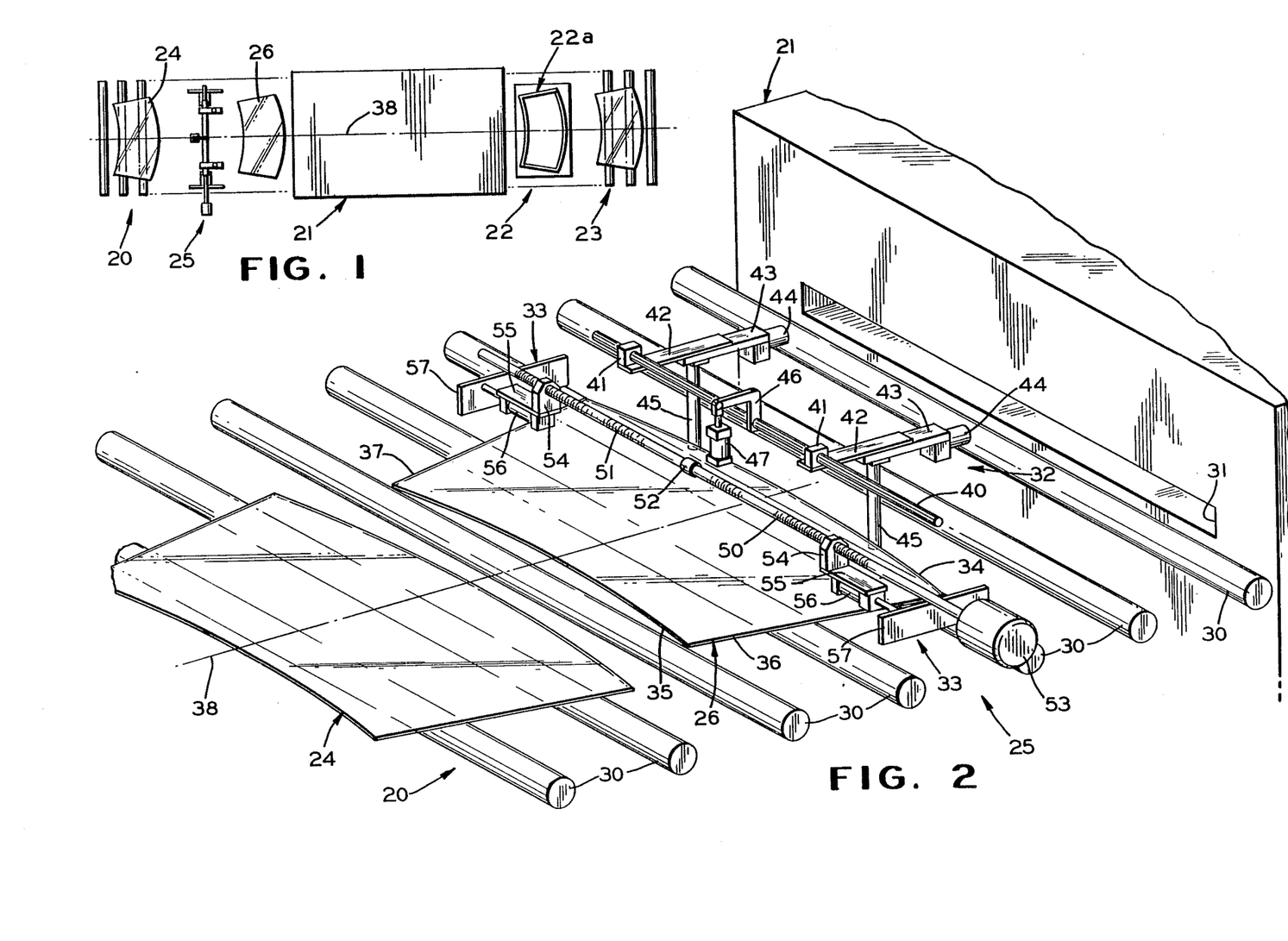
FIG. 1 is a top plan view of a portion of a windshield bending installation including an alignment apparatus in accordance with the present invention.
FIG. 2 is a perspective view of the alignment apparatus shown in FIG. 1 with most of the actuating mechanism removed for viewing purposes.

There is shown in FIG. 1 a portion of a windshield bending installation including a first or supply conveyor 20 which delivers glass sheets to the entrance of a furnace 21 for heating the glass sheets to bending temperatures. As the sheets leave the furnace 21, they enter a bending station 22 where they are shaped to the desired curvature by suitable bending apparatus 22a and transported by a second conveyor 23 to a cooling station (not shown). As shown in FIG. 1, a glass sheet 24 has been transported by the supply conveyor 20 to the entrance to an alignment apparatus 25 in accordance with the present invention. Another glass sheet 26 has just left the alignment apparatus 25 and is about to enter the furnace 21. The alignment apparatus 25 positions the glass sheets such that they enter the bending station 22 in the proper orientation and they exit the furnace 21 in the same orientation. Accurate alignment of the individually sized sheets relative to the the bending apparatus 22a is necessary so that after shaping, the sheets of each set will nest properly with their edges in alignment to insure a good fit for the vacuum ring used in the laminating process.

As shown in FIG. 2, the conveyor 20 can include a plurality of rollers 30 which are aligned in a horizontal plane leading to an entrance opening 31 in the furnace 21. The drive mechanism for the rollers is conventional and is not shown. In FIG. 2, the glass sheet 26 is shown in the alignment apparatus 25 and the glass sheet 24 is shown as the next sheet in a sequence of glass sheets which will be explained below.

The alignment apparatus 25 includes a front or leading edge positioning mechanism 32 and a side or end edge positioning mechanism 33, both of which are shown without a portion of the associated control mechanism in order to better view the engagement with the edges of the glass sheet 26. The glass sheets 24 and 26 are depicted as elements of a laminated windshield. For example, the glass sheet 26 can be an outer light having a lower edge 34, and upper edge 35, and side or end edges 36 and 37. The glass sheets are oriented such that the lower edge 34 is a leading edge as the glass sheet is moved down the production line. It is desired to position the glass sheet 26 such that the end edges 36 and 37 are equidistant from an imaginary center line 38 which extends through the furnace 21 and the bending apparatus 22a to assure that when the glass sheets are stacked for laminating, the edges are properly aligned to accept a vacuum ring. The glass sheet 24 can be, for example, an inner light which is stacked on top of the glass sheet 26 in an assembly station (not shown) to form a sandwich with a plastic sheet in between. If a laceration shield window assembly is being manufactured, a third glass sheet which is a removable cover plate is stacked on top of the glass sheet 24 with an anti-lacerative sheet between them to complete the window assembly.

As shown in FIG. 2, the front or leading edge positioning mechanism 32 includes a splined shaft 40 positioned parallel to the rollers 30 and above the path of travel of the glass sheets 24 and 26 on the rollers 30. The shaft 40 is rotatably supported, as will be described below, and extends through a pair of bearing blocks 41 associated with a pair of front stop assemblies. Although two front stop assemblies are shown, any suitable number of front stop assemblies can be utilized. Each bearing block 41 is mounted on a top surface of a front stop slide mounting bracket 42. Mounted on the lower surface of each mounting bracket 42 is slide mechanism 43 actuated by an electric motor 44. Extending vertically downwardly from the slide mechanism 43 is a stop tube 45. Typically, the stop tubes 45 are positioned equidistant from the center line 38 to engage the lower or leading edge 34 of the glass sheet 26.

Attached to the shaft 40 between the bearing blocks 41 is one end of a spline rotating lever 46. The other end of the lever 46 is attached to a piston rod extending from an air cylinder 47. Although not shown in FIG. 2, the air cylinder 47 is fixed with respect to the mounting of the shaft 40. When the air cylinder 47 is actuated to retract the rod, the lever arm 46 rotates the shaft 40 and the attached stop mechanisms in a counterclockwise direction as viewed from the end of the shaft 40 closest to the viewer. The stop tubes 45 are moved away from the lower or leading edge 34 of the glass sheet 26 thereby allowing the glass sheet 26 to proceed along the conveyor 20 into the entrance opening 31 of the furnace 21.

The side or end edge positioning mechanism 33 includes a pair of oppositely threaded shafts 50 and 51 connected together by a coupling 52. The shafts 50 and 51 are rotatably mounted in a support apparatus (not shown) which will be described below. An electric stepping motor 53 is attached to the free end of the shaft 50. Each of the shafts 50 and 51 is threadably engaged in a bearing block 54. Each bearing block 54 is mounted on an upper side of a side pusher mounting bracket 55. An air cylinder 56 is mounted on the underside of the mounting bracket 55 and a rod of the air cylinder 56 is attached to a side pusher bracket 57 which extends generally parallel to the center line 38. When the air cylinders 56 are actuated to retract the rods, the brackets 57 are moved into engagement with the side or end edges 36 and 37 of the glass sheet 26 to position the glass sheet with respect to the center line 38. The stepper motor 53 can be actuated to rotate the threaded shafts 50 and 51 by a predetermined amount to adjust the spacing between the brackets 57 for different length sheets.

Referring to FIGS. 3 and 5 through 8, the front or leading edge positioning mechanism 32 is shown in more detail. The glass sheet 26 is supported by a plurality of the rollers 30. The lower or leading edge 34 of glass sheet 26 is moved toward the furnace until it engages the lower ends of the stop tubes 45. At least the lower end of each stop tube 45 is hollow and encloses a helical spring 60. The lower end of the spring 60 abuts an upper end of a stop pin 61. The lower end of the stop pin 61 extends from the lower end of the tube 45 into engagement with the edge 34. The stop pin 61 is typically formed of a material which will not scratch the glass sheet 26 such as a nylon. The spring 60 and the stop pin 61 can be retained in the tube in any conventional manner which permits the pin to be forced into the tube against the spring. Such operation prevents the breakage of glass sheets should the tube 45 be lowered in a manner such that the lower end of the stop pin 61 engages the upper surface of a sheet of glass rather than the leading edge. The lower end of the stop tube 45 is positioned above the upper surface of the plane of the glass sheet 26.

Figure 3:
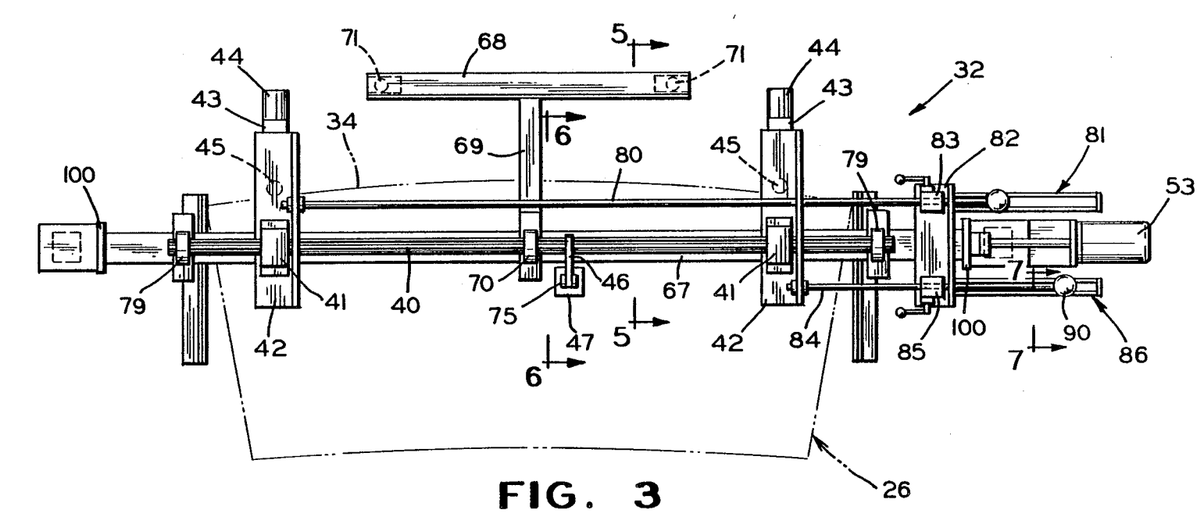
FIG. 3 is a top plan view of the forward stop mechanism of the alignment apparatus shown in FIGS. 1 and 2.
Figure 5:
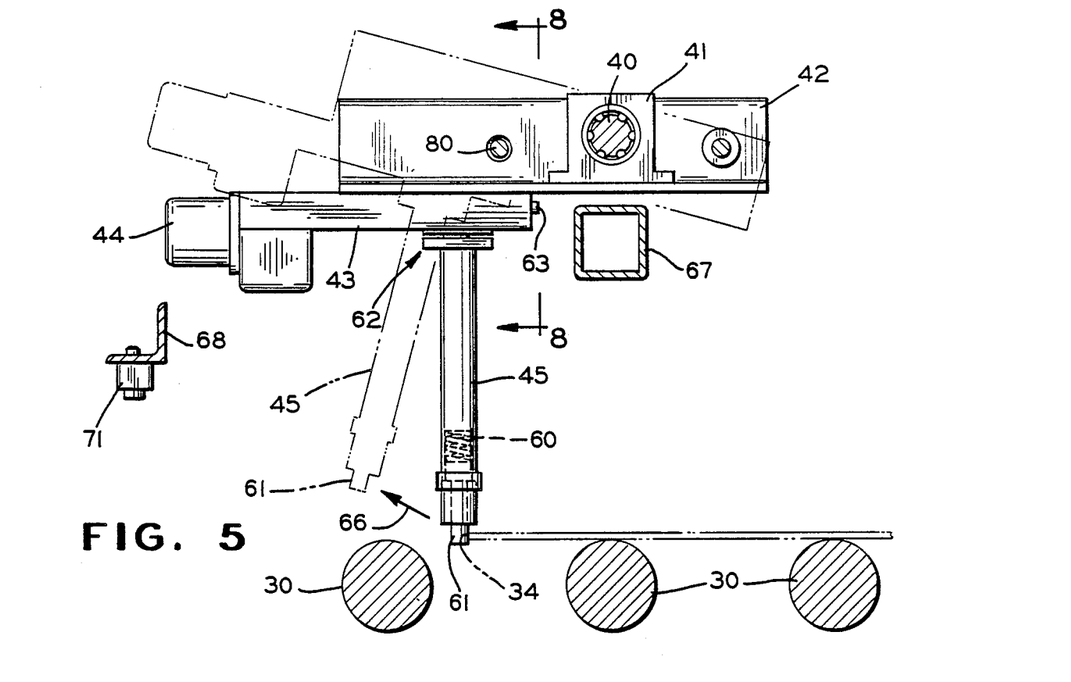
FIG. 5 is a cross-sectional view taken along the line 5—5 of FIG. 3.

The upper end of the stop tube 45 is attached to a moveable slide 62 included in the slide mechanism 43. The slide mechanism 43 is commercially available as a Velmex Unislide #S-B2503W1J. The attached electric motor 44 can be a Bodine type "K" model #730. The slide mechanism 43 and motor 44 can be utilized to selectively position the stop pin 61 to determine the reference point at which glass sheets will be stopped before entering the furnace.

Figures 6, 7, 8:
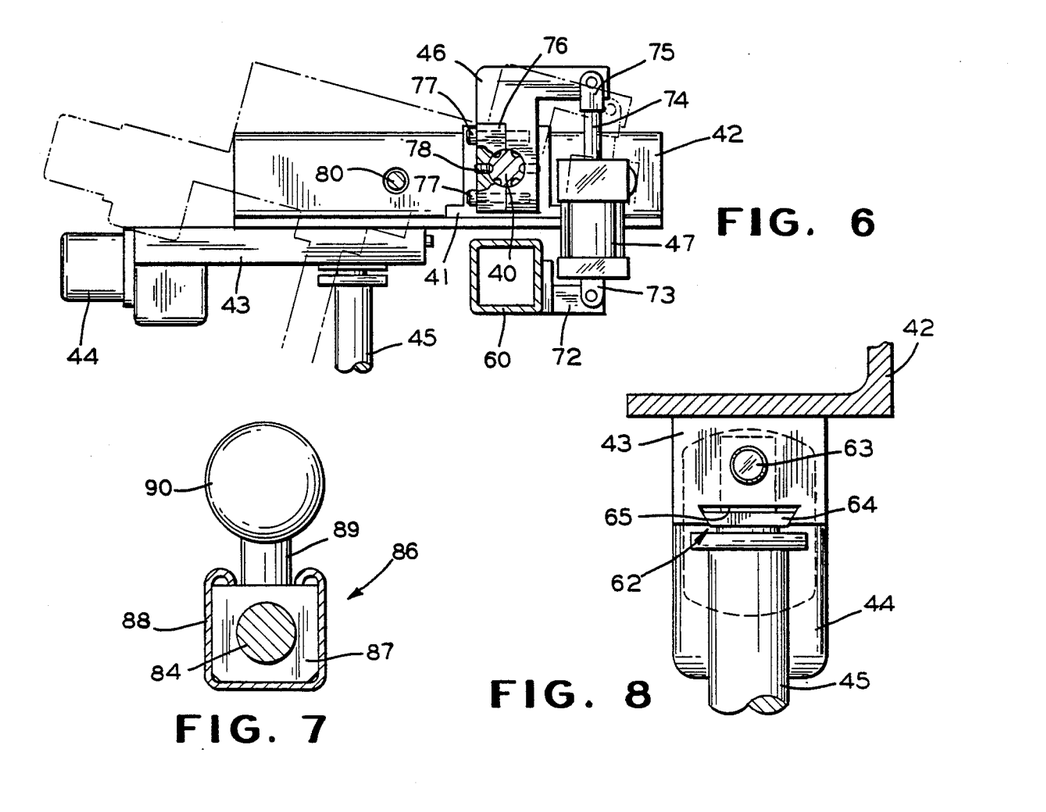
FIG. 6 is a cross-sectional view taken along the line 6—6 in FIG. 3.
FIG. 7 is a cross-sectional view taken along the line 7—7 in FIG. 3.
FIG. 8 is a cross-sectional view taken along the line 8—8 in FIG. 5.

As shown in FIGS. 5 and 8, an upper end of the stop tube 45 is threadably received on a drive shaft 63 which is connected to the motor 44. When the motor 44 rotates the drive shaft 63 in one direction, the stop tube 45 and stop pin 61 will be moved in a direction to stop the glass sheets farther from the opening of the furnace and when the motor 44 reverses its direction of rotation, the stop tube 45 and stop pin 41 will be moved to a position closer to the opening of the furnace. As shown best in FIG. 8, a trapezodial slide member 64 is attached to the upper end of the stop tube 45 below the point of attachment of the drive shaft 63. The slide member 64 mates with a similarly shaped groove 65 formed in the bottom surface of the slide mechanism 43. The groove 65 extends parallel to the longitudinal axis of the drive shaft 63 to support and guide the stop tube 45 during movement.

The mounting bracket 42 and bearing block 41 are connected for rotation with the splined shaft 40. As shown in FIG. 5, when the splined shaft 40 rotates in a clockwise direction, the stop tube 45 and the stop pin 61 will be moved in the direction of an arrow 66 to the position shown in phantom line. Thus, the stop pin 61 is moved out of contact with the leading edge 34 to allow the rollers 30 of the conveyor to move the glass sheet 26 into the opening of the furnace. The degree of rotation of the front or leading edge positioning mechanism can be controlled by the stroke of the air cylinder 47 and/or contact between a lower surface of the mounting bracket 42 and an upper surface of a tubular frame member 67.

As shown in FIGS. 3 and 5, a skew verification sensor bracket 68 extends transversely of the direction of travel of the glass sheets on the conveyor. The bracket 68 is attached at one end of a skew verification mounting bracket 69 which has its other end attached to a bottom surface of the frame member 67. A bearing block 70 is attached to the upper surface of the frame member 67 above the mounting bracket 69 and rotatably supports the splined shaft 40. A pair of sensors 71 are mounted at opposite ends of the sensor bracket 68. The sensors 71 can typically be commercially available photoelectric elements and are utilized as will be explained below to determine whether the glass sheet 26 is skewed after it has been released by the stop tubes 45.

As shown in FIGS. 3 and 6, a mounting bracket 72 extends from a side surface of the frame member 67 to provide a pivot point mounting for a lower end of the air cylinder 47. The air cylinder 47 has a piston rod 74 which terminates in a clevis 75 that is pivotally attached to one end of the splined rotating lever 46. The other end of the lever 46 has a removeable section 76 which can be attached to the main body by a pair of cap screws or fasteners 77. The main body and the removable sections 76 form an aperture for receiving the splined shaft 40. One or more allen screws 78 can be threaded into the removeable section 76 or the main body of the lever 46 and into engagement with the splined shaft 40 to lock the splined shaft 40 and the lever 46 together for corotation. When the air cylinder 47 retracts the piston rod 74, the lever arm 46 and the splined shaft 40 are rotated in a clockwise direction to the position shown by the phantom lines. The ends of the splined shaft 40 are rotatably mounted on an upper surface of the frame member 67 in a pair of bearing blocks 79 which are similar to the center bearing blocks 70.

The stop tubes 45 also include means for positioning them in a direction transverse to the center line 38. A first adjustment shaft 80 has one end connected to the left hand one of the mounting brackets 42 in FIG. 3. The connection can be made by any suitable means such as a pair of snap rings. The adjustment shaft 80 extends through an aperture formed in the other one of the mounting brackets 42 and terminates in an adjustment block 81. The adjustment block 81 is attached to an upwardly facing flange of an L-shaped mounting bracket 82. A generally horizontally extending flange of the mounting bracket 82 is attached to an upper surface of the frame member 67 and the bracket 82 extends transverse of the longitudinal axis of the frame member 67.

Mounted on the bracket 82 is a locking mechanism 83. The shaft 80 passes through the locking mechanism 83 and is free to slide therein when the locking mechanism is in the unlocked position. Thus, the adjustment shaft 80 can be utilized to move the left hand mounting bracket 42 and its associated stop tube 45 along the splined shaft 40 to position stop tube 45 with respect to the center line 38. When the desired position is reached, the locking mechanism 83 can be moved to the locked position to prevent any further movement of the stop tube 45. A second adjustment shaft 84, shorter than the adjustment shaft 80, has one end attached to the right hand one of the mounting brackets 42. The shaft 84 passes through a locking mechanism 85 similar to the locking mechanism 83 and mounted on the mounting bracket 82. After passing through the upstanding flange of the mounting bracket 82, the adjustment shaft 84 terminates in an adjustment block 86 similar to the adjustment block 81.

As shown in more detail in FIG. 7, the adjustment block 86 includes a slide 87 which is generally square in cross-section. The adjustment shaft 84 extends through the center of the slide 87 and is attached thereto. The slide 87 is retained in a generally U-shaped channel member 88 which has its upper ends curled over to retain the slide 87. A stud 89 extends from an upper surface of the slide 87 and is capped by a ball 90 to form a handle for manually moving the slide 87 along the longitudinal axis of the channel 88.

Figure 4:
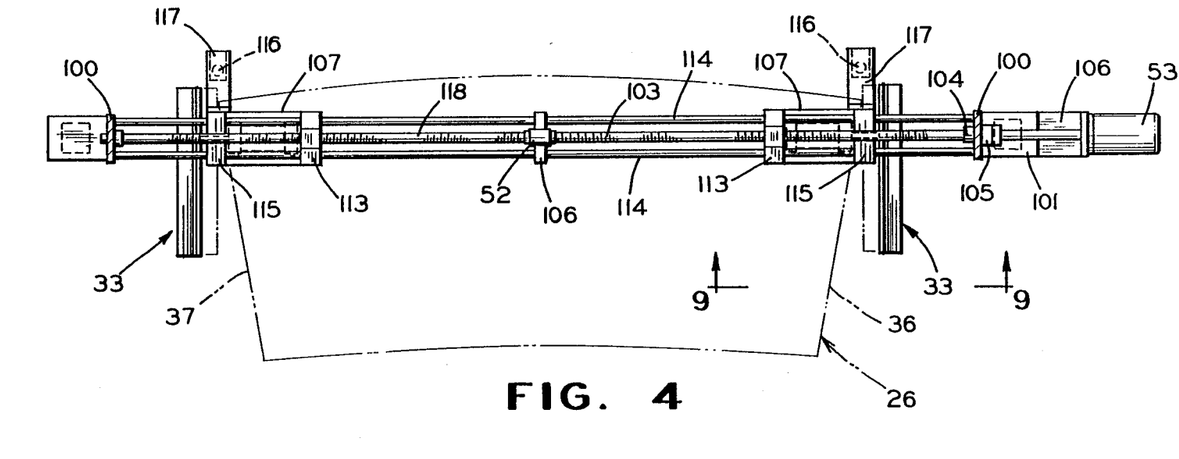
FIG. 4 is a top plan view of the side alignment mechanism of the alignment apparatus shown in FIGS. 1 and 2.
Figure 9:
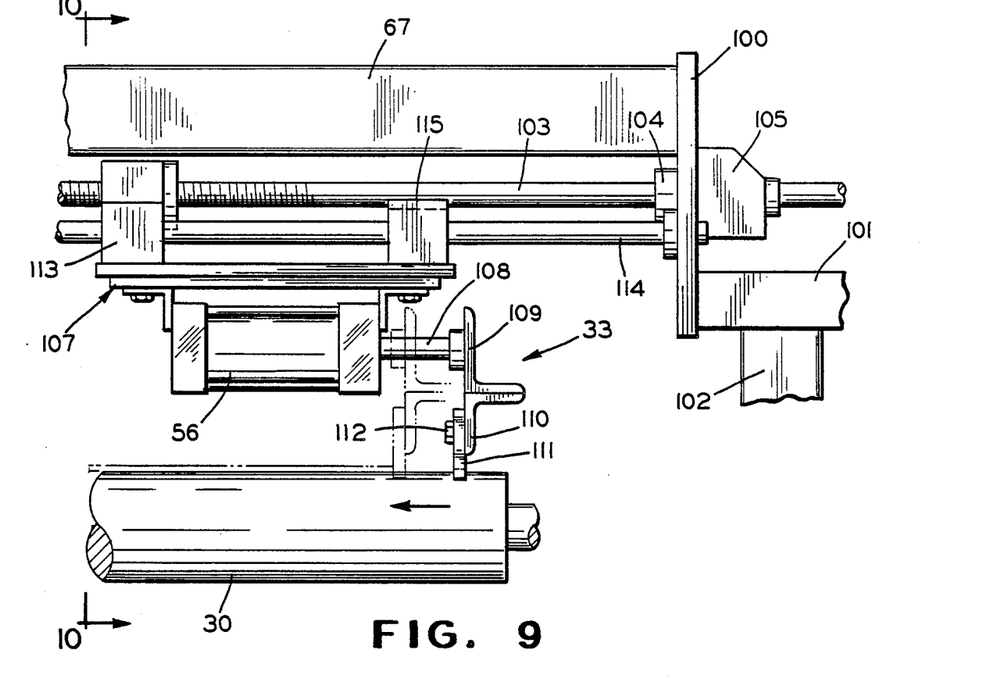
FIG. 9 is a cross-sectional view taken along the line 9—9 in FIG. 4.

In FIG. 4, the tubular frame member 67 and all of the previously described elements which are attached thereto have been removed to disclose the side or end edge positioning mechanism 33. Referring to FIGS. 3, 4 and 9, the ends of the frame member 67 are attached to an upper end of each of a pair of downwardly extending plate members 100. As shown in FIG. 9, the lower end of the plate member 100, attached to the right hand end of the frame member 67, is attached to one end of a generally horizontally extending support plate 101. A support column 102 extends downwardly from a lower surface of the support plate 101 and attaches to a support beam (not shown) or other supporting structures for the alignment apparatus 25 and the associated conveyor 20. The opposite end of the frame member 67 is supported in a similar manner.

Referring to FIGS. 4 and 9, a first threaded drive shaft 103 extends through a bearing block 104 mounted on the plate member 100. A digital counter 105 can be attached to the drive shaft 103 to provide an indication of the relative rotational position of the drive shaft 103. The counter 105 can be any suitable mechanical or electrical commercially available device. The right hand end of the drive shaft 103 is connected to the stepping motor 53 which is mounted on an L-shaped bracket 106 attached to an upper surface of the support plate 101. The opposite end of the drive shaft 103 is attached to the coupling 52 which in turn is rotatably maintained in a center support bracket 106 which can be attached to a lower surface of the frame member 67.

The air cylinder 56 is attached to a lower surface of the mounting bracket assembly 107. The air cylinder 56 includes a piston rod 108 which is attached to the side or end edge positioning mechanism 33. The positioning mechanism 33 includes a generally T-shaped bracket formed in two pieces. An upper portion 109 of the bracket, as better shown in FIG. 10, has a trapezoidal shaped vertically extending flange and an elongated horizontally extending flange. A lower surface of the horizontally extending flange is attached to an upper surface of a horizontally extending flange of a lower portion 110 of the bracket. The lower portion 110 has a vertically downwardly extending flange to which a side pusher 111 is attached by a plurality of fasteners 112. A lower edge of the side pusher 111 extends below the plane in which the glass sheets travel on the tops of the rollers 30. Therefore, the lower edge is cut out to clear the rollers 30 thereby insuring that the side pusher 111 will make full contact with the edge of any glass sheet.

Figure 10:
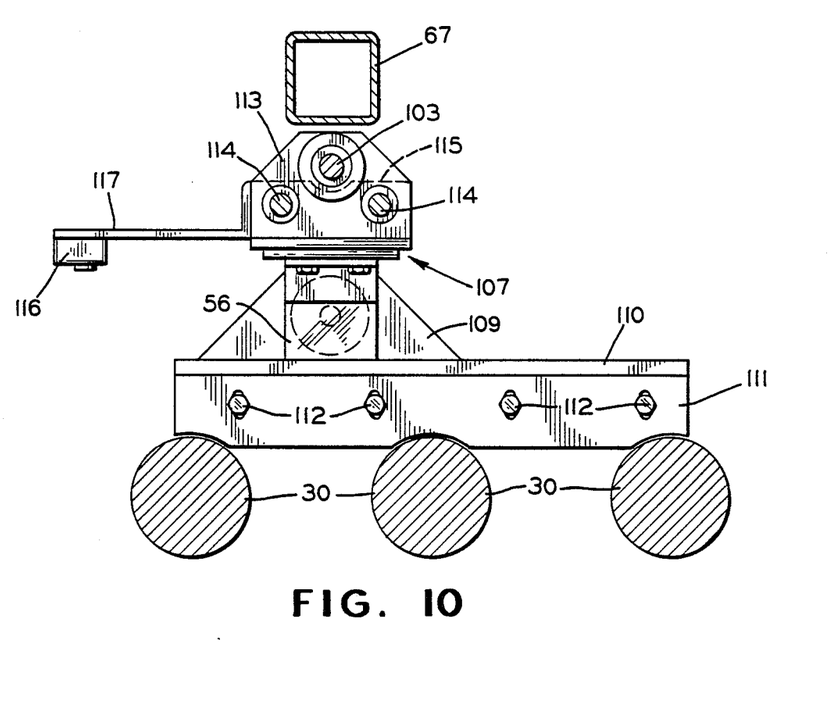
FIG. 10 is a cross-sectional view taken along the line 10—10 in FIG. 9.

As shown in FIGS. 9 and 10, a threaded bearing block 113 is attached to an upper surface of the mounting bracket assembly 107. The bearing block 113 threadably engages the drive shaft 103 such that rotation of the drive shaft 103 will cause the bearing block 113 to move along the longitudinal axis of the drive shaft. The threaded bearing block 113 is also supported on and guided by a pair of guide shafts 114 which extend between the plate members 100 and are also retained in the center support bracket 106. Thus, the bearing block 113 is free to slide along the guide shafts 114 as it is being driven by the drive shaft 103 and the stepping motor 53. The threaded bearing block 113 is attached at one end of the mounting bracket assembly 107 and a bearing block 115 is attached at the other end of the bracket assembly 107. Bearing block 115 is slideably mounted on the pair of guide shafts 114 but does not engage the drive shaft 103.

As shown in FIGS. 4 and 10, a sequence sensor 116 can be mounted on one end of a bracket 117 having its other end attached to the bearing block 115. The sequence sensor can be a commercially available photoelectric cell which is positioned to detect an indicating mark on each glass sheet which identifies the type of glass sheet passing through the alignment station. Although two sequence sensors are shown, any number can be utilized depending upon how many marks are desired and where they are positioned on the glass sheets. Thus, for example, a single sensor could be mounted on a bracket extending from the frame member 67 near the skew verification mounting bracket 69. Such a sensor could also be provided with position adjusting means such as the slide mechanisms 43.

In operation, the side or edge positioning mechanisms are driven into position on either side of the center line 38 by rotating the drive shaft 103 and the drive shaft 118. The positions correspond to a distance from the center line 38 equal to one half of the length of the sheet of glass to be aligned plus the stroke of the piston 108 of the air cylinder 56. The stop tubes 45 are initially positioned utilizing the adjustment blocks 81 and 86 and then are locked into the selected positions utilizing the locking mechanisms 83 and 85. The air cylinder 47 has its piston rod 74 in the extended position to hold the stop tubes 45 in the desired vertical alignment. The glass sheet 26 is then moved by the conveyor rollers 30 up against the stop pins 61. The air cylinders 56 are actuated to bring the side pushers 111 into contact with the end edges 36 and 37 of the glass sheet 26. Thus, the glass sheet 26 is aligned with respect to the center line 38 and is ready to be transported into the furnace 21. If the glass sheet deviates from the center line 38 during its trip through the furnace 21, such deviation can be corrected by precisely shifting the alignment apparatus 25 as a unit transversely with respect to the center line 38.

The air cylinders 56 are actuated to retract the side pushers 111 and the air cylinder 47 is actuated to retract its piston rod to rotate the stop pins 61 into position above the glass sheet 26. The conveyor 20 then moves the glass sheet 26 on the rollers 30 into the opening 31 of the furnace 21. The stepping motor 53 is actuated to adjust the position of the side or end edge positioning mechanisms 33 for the next glass sheet in the sequence which sheet has a slightly shorter length than the glass sheet 26 which was just aligned. Assuming that the first glass sheet was the outboard sheet of a windshield, the second glass sheet was the inboard sheet, and the third glass sheet was a cover plate, the distance between the positioning mechanisms 33 becomes progressively smaller. After the third glass sheet has been aligned, the stepping motor 53 operates in the opposite direction to widen the distance between the positioning mechanisms 33 in preparation for aligning another outboard sheet as the sequence begins to repeat.

Figure 11:
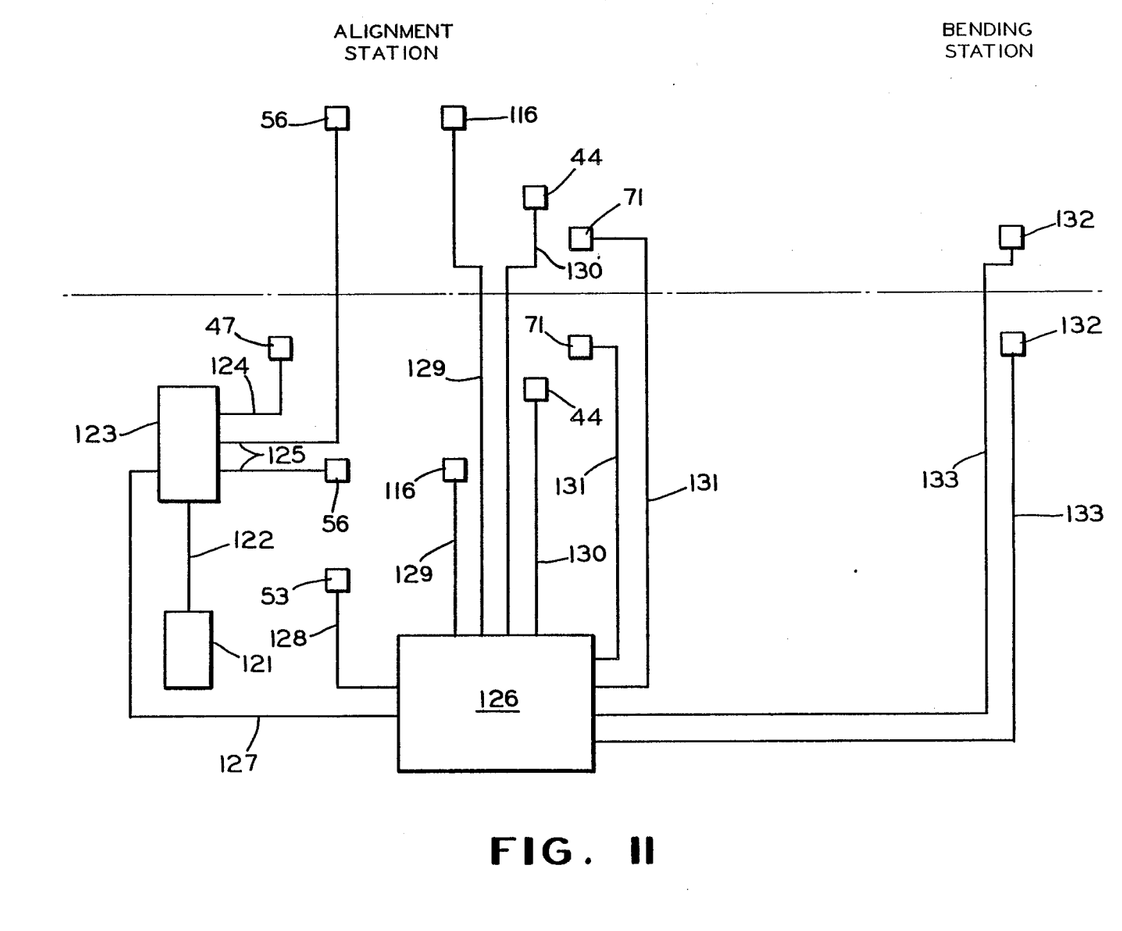
FIG. 11 is a schematic diagram of a control system for automatically adjusting the stop tubes of the invention.

There is shown in FIG. 11, a control system for automatically adjusting the stop tubes 45. A source of compressed fluid 121 is connected by a conduit 122 to a valve assembly 123. Although shown as a single element, the valve assembly 123 can actually be an individual valve for each air cylinder to be controlled. The valve assembly 123 is connected to the air cylinder 47 by a conduit 124, and is connected to the air cylinders 56 by a pair of conduits 125. A central control element 126 such as a programmed general purpose computer is connected by a line 127 to the valve assembly 123. The computer 126 generates electrical control signals over the line 127 to control the application of compressed air from the source 121 to the air cylinders 47 and 56 and the alternate venting of the air cylinders.

The computer 126 is also connected to the stepping motor 53 by a line 128. Thus, the computer can control the actuation of the stepping motor 53 to accommodate any sequence of different length glass sheets desired. The computer 126 is also connected by a pair of lines 129 to the sequence sensors 116. Thus, the computer 126 receives from the sensors 116 the information necessary to generate the control signals on the line 128 to the stepping motor 53.

The computer 126 is connected by a pair of lines 130 to the electric motors 44 which drive the slide mechanisms 43. The computer 126 is also connected to the alignment sensors 71 by a pair of lines 131. Thus, the computer 126 sees the information from the alignment sensors 71 necessary to generate control signals on the lines 130 to actuate the motors to move the alignment stop tubes 45 to the proper positions. As discussed above, a pair of skew sensors 132 can be located at the bending station 22 to sense the alignment of the glass sheets relative to the bending apparatus 22a. The skew sensors 132 are connected by a pair of lines 133 to the computer 126 to send the alignment information back to the computer. Thus, the computer can also take into account the skew information from the bending station in determining the proper control signals to send to the electric motors 44 for adjustment of the stop tubes 45.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for aligning with respect to a reference point sheets of material of different dimensions moving along a path of travel, comprising:
    at least two stop pins positioned in a plane in which sheets of material are to be aligned for engaging a leading edge of sheets of material in said plane to align said sheets with respect to a reference point;
    at least one side aligning means positioned in said plane at a selected one of at least two different predetermined distances from said reference point, said side aligning means including a pusher means and reciprocating means for advancing said pusher means toward said reference point with said side aligning means positioned at each of said at least two different predetermined distances for engaging an end edge of sheets of material in said plane to align said sheets with respect to said reference point;
    means for automatically selecting one of said predetermined distances in accordance with a predetermined sequence of delivery of sheets of material of different dimensions along said path of travel to said stop pins; and
    means for moving said side aligning means relative to said reference point in response to said means for automatically selecting;
    said means for moving said side aligning means including a sensor for detecting sheets of material and generating a sequence signal representing an identification of said sheets, and said means for automatically selecting being responsive to said sequence signal for controlling said means for moving said side aligning means.

2. The apparatus according to claim 1 wherein said reference point is a center line defining said path of travel of said sheets of material.

3. The apparatus according to claim 2 wherein said at least two stop pins are positioned on opposite sides of said center line.

4. The apparatus according to claim 2 including means for moving at least one of said stop pins along a predetermined path generally transverse to said center line.

5. The apparatus according to claim 4 wherein said means for moving at least one of said stop pins along a path generally transverse to said center line includes means for locking said stop pin at a selected position along said path.

6. The apparatus according to claim 2 including means for moving at least one of said stop pins along a predetermined path generally parallel to said center line.

7. The apparatus according to claim 1 wherein said means for moving includes a bearing block attached to said side aligning means, said bearing block threadably engaging a threaded shaft, and a stepping motor for rotating said shaft, said stepping motor having an output shaft attached to said threaded shaft and being connected for actuation to said means for automatically selecting.

8. The apparatus according to claim 1 wherein said means for automatically selecting is responsive to the absence of said sequence signal for generating an alarm signal representing the absence of a sheet of material.

9. An apparatus for aligning with respect to a reference point sheets of material of different dimensions moving along a path of travel, comprising:

at least two stop pins positioned in a plane in which sheets of material are to be aligned for engaging a leading edge of sheets of material in said plane to align said sheets with respect to a reference point, said reference point being a center line defining said path of travel of said sheets of material;

at least one side aligning means positioned in said plane for movement from a selected one of at least two different predetermined distances toward said reference point for engaging an end edge of sheets of material in said plane to align said sheets with respect to said reference point;

means for automatically selecting one of said predetermined distances in accordance with a predetermined sequence of delivery of sheets of material of different dimensions along said path of travel to said stop pins;

means for moving said side aligning means relative to said reference point in response to said means for automatically selecting;

means for moving at least one of said stop pins along a predetermined path generally parallel to said center line; and a sensor means for detecting a leading edge of sheets of material and generating a detection signal, and control means responsive to said detection signal for actuating said means for moving at least one of said stop pins.

10. The apparatus according to claim 9 wherein said sensor is positioned adjacent said at least one of said stop pins.

11. The apparatus according to claim 9 wherein said sensor is spaced from said at least one of said stop pins along said path of travel of said sheets of material.

12. An apparatus for automatically aligning a plurality of different length glass sheets prior to a manufacturing operation comprising:

at least two stop pins positioned to engage a leading edge of a glass sheet at a predetermined position with respect to a reference line;

at least one side aligning means, including pusher means positioned for movement into engagement with an end edge of a glass sheet from a predetermined distance toward the reference line, and reciprocating means for moving said pusher means;

means for positioning said side aligning means at said predetermined distance;

means for selectively changing said predetermined distance in accordance with a predetermined sequence of delivering glass sheets of different lengths to said stop pins; and sensor means for detecting a glass sheet and generating a sequence signal representing an identification of the glass sheet by length, and wherein said means for selectively changing is responsive to said sequence signal for actuating said means for positioning.

13. The apparatus according to claim 12 including means for individually moving each of said stop pins along a predetermined path generally parallel to said reference line.

14. The apparatus according to claim 13 including means for individually moving each of said stop pins along another predetermined path generally transverse to said reference line.

15. An apparatus for aligning sheets of glass prior to a manufacturing operation, the sheets being conveyed to the alignment apparatus in a predetermined sequence according to end-to-end length, comprising:

at least a pair of stop pins extending into a plane in which sheets of glass are to be aligned for engaging a leading edge of the sheets, each stop pin of said pair being positioned on opposite sides of a reference line defining a path of travel along which the sheets of glass are being conveyed to align the sheets with respect to said reference line;

a pair of side aligning means positioned on opposite sides of said reference line for engaging opposed end edges of sheets of glass to align the sheets with respect to said reference line;

means connected to said side aligning means for automatically moving said side aligning means to one of a plurality of predetermined positions with respect to said reference line corresponding to the end-to-end length of a glass sheet engaged by said stop pins;

sensor means for detecting the alignment of a leading edge of a glass sheet with respect to said reference line and for generating an alignment signal;

and means responsive to said alignment signal for moving said stop pins in a direction generally parallel to said reference line.

16. The apparatus according to claim 15 wherein said means for automatically moving said side aligning means includes second sensor means for detecting a glass sheet engaged by said stop pins and for generating a sequence signal representing the end-to-end length of the glass sheet.

17. An apparatus for automatically aligning a plurality of different length glass sheets prior to a manufacturing operation comprising:

at least two stop pins positioned to engage a leading edge of a glass sheet at a predetermined position with respect to a reference line;

at least one side aligning means positioned for movement from a predetermined distance toward the reference line to engage an end edge of a glass sheet;

means for positioning said side aligning means at said predetermined distance;

means for selectively changing said predetermined distance in accordance with a predetermined sequence of delivering glass sheets of different lengths to said stop pins;

sensor means for detecting a glass sheet and generating a sequence signal representing an identification of the glass sheet by length, and wherein said means for selectively changing is responsive to said sequence signal for actuating said means for positioning;

means for individually moving each of said stop pins along a predetermined path generally parallel to said reference line;

second sensor means for detecting a leading edge of a glass sheet and generating a detection signal and;

control means responsive to said detection signal for actuating said means for individually moving.

* * * * *